United States Patent
Kim

(10) Patent No.: US 7,621,841 B2
(45) Date of Patent: Nov. 24, 2009

(54) GEAR TRAIN OF AN AUTOMATIC TRANSMISSION FOR A VEHICLE

(75) Inventor: Woo Yeol Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/398,932

(22) Filed: Mar. 5, 2009

(65) Prior Publication Data

US 2009/0170653 A1    Jul. 2, 2009

Related U.S. Application Data

(62) Division of application No. 11/602,157, filed on Nov. 20, 2006.

(30) Foreign Application Priority Data

Oct. 26, 2006    (KR) .................. 10-2006-0104595

(51) Int. Cl.
*F16H 3/44*    (2006.01)
(52) U.S. Cl. .................. 475/287; 475/275; 475/330
(58) Field of Classification Search ......... 475/275–292, 475/323–325, 330, 317–319
See application file for complete search history.

(56) References Cited

U.S. PATENT DOCUMENTS 5,098,357 A    3/1992    Asada et al.
6,634,980 B1    10/2003    Ziemer
7,172,527 B2    2/2007    Abe et al.
7,311,634 B2 *    12/2007    Shim ..................... 475/275
7,452,303 B2    11/2008    Seo
2004/0097324 A1    5/2004    Ziemer

FOREIGN PATENT DOCUMENTS

JP    2006-125585 A    5/2006

* cited by examiner

*Primary Examiner*—David D Le
*Assistant Examiner*—Justin Holmes
(74) *Attorney, Agent, or Firm*—Morgan, Lewis & Bockius LLP

(57) ABSTRACT

An eight speed gear train of an automatic transmission includes first and second planetary gear sets as simple planetary gear sets, a third planetary gear set as a compound planetary gear set, and a plurality of friction members. The first planetary gear set reduces engine speed from an input shaft through a first input path and outputs the reduced speed through a first intermediate output path. The second planetary gear set receives the reduced speed through first and second intermediate input paths, and outputs a further reduced speed or a reversed speed through a second intermediate output path. The third planetary gear set selectively receives the engine speed from the input shaft through a second input path, selectively receives input speeds from the first and second planetary gear sets through third and fourth intermediate input paths, and outputs a plurality of speeds through a final output path.

5 Claims, 6 Drawing Sheets

FIG.2

|  | C1 | C2 | C3 | C4 | B1 | B2 | F1 |
|---|---|---|---|---|---|---|---|
| 1st | ● |  |  |  | ○ |  | ● |
| 2nd | ● |  |  |  |  | ● |  |
| 3rd | ● |  |  | ● |  |  |  |
| 4th | ● |  | ● |  |  |  |  |
| 5th |  |  | ● | ● |  |  |  |
| 6th |  | ● | ● |  |  |  |  |
| 7th |  |  | ● |  |  | ● |  |
| 8th |  |  | ● |  | ● |  |  |
| reverse 1th |  |  |  | ● | ● |  |  |

GEAR TRAIN OF AN AUTOMATIC TRANSMISSION FOR A VEHICLE

CROSS-REFERENCES TO RELATED APPLICATIONS

This application is a Divisional of U.S. patent application Ser. No. 11/602,157, filed Nov. 20, 2006, which claims priority to and the benefit of Korean Patent Application No. 10-2006-0104595 filed in the Korean Intellectual Property Office on Oct. 26, 2006, the entire contents of which are incorporated herein by reference.

BACKGROUND OF THE INVENTION

1. Field of the Invention

The present invention relates to a gear train of an automatic transmission for a vehicle and more specifically a gear train with eight forward speeds.

2. Description of the Related Art

A typical shift mechanism of an automatic transmission utilizes a combination of a plurality of planetary gear sets. A gear train of such an automatic transmission that includes the plurality of planetary gear sets changes rotating speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a gear train such as durability, efficiency in power transmission, and size depend a lot on the layout of combined planetary gear sets. Therefore, designs for a combining structure of a gear train are also under constant investigation.

A manual transmission that has too many speeds causes inconvenience of excessively frequent shifting operations by the driver. Therefore, the positive features of more shift-speeds are more important for automatic transmissions because an automatic transmission automatically controls shifting operations basically without needing manual operation.

In addition to various developments regarding four and five speed gear trains, gear trains of automatic transmissions realizing six forward speeds and one reverse speed have been introduced, and also, gear trains realizing more number of speeds are under investigation.

The above information disclosed in this Background section is only for enhancement of understanding of the background of the invention and therefore it may contain information that does not form the prior art that is already known in this country to a person of ordinary skill in the art.

SUMMARY OF THE INVENTION

Various embodiments of the present invention provide a gear train having advantages including improved power transmission performance and reduced fuel consumption.

An exemplary gear train of an automatic transmission for a vehicle according to an embodiment of the present invention includes first and second planetary gear sets of simple planetary gear sets, a third planetary gear set of a compound planetary gear set, and a plurality of friction members. The first planetary gear set reduces an engine speed received from an input shaft through a first input path and outputs the reduced speed through a first intermediate output path. The second planetary gear set receives the reduced speed through first and second intermediate input paths, and outputs the reduced speed or a reversed speed through a second intermediate output path, the second planetary gear set selectively acting as a fixed element. The third planetary gear set selectively receives the engine speed from the input shaft through a second input path, selectively receives input speeds from the first and second planetary gear sets through third and fourth intermediate input paths, and outputs a plurality of changes speeds through a final output path.

The first and second planetary gear sets may be single pinion planetary gear sets, and the third planetary gear set may be a compound planetary gear set in a combination of single and double pinion planetary gear sets that share a ring gear and a planet carrier.

The first planetary gear set may include a sun gear that set always acts as a fixed element, a planet carrier that forms the first intermediate output path, and a ring gear that forms the first input path by being directly connected with the input shaft.

The second planetary gear set may include a sun gear that forms the first intermediate input path by being fixedly connected to the first intermediate output path of the first planetary gear set, a planet carrier that selectively acts as a fixed element and forms the second intermediate input path by being variably connected to the first intermediate output path of the first planetary gear set, and a ring gear that selectively acts as a fixed element and forms the second intermediate output path.

The third planetary gear set may include a smaller-diameter sun gear that forms the third intermediate input path by being variably connected to the first intermediate output path of the first planetary gear set, a larger-diameter sun gear that forms the fourth intermediate input path by being directly connect to the second intermediate output path of the second planetary gear set, a planet carrier that forms the second input path by being variably connected with the input shaft, and a ring gear that is variably connected with the larger-diameter sun gear of the third planetary gear set and forms a final output path.

In a further embodiment of the present invention, the first planetary gear set may be a single pinion planetary gear set. The second planetary gear set may be a double pinion planetary gear set. The third planetary gear set may be a compound planetary gear set in a combination of single and double pinion planetary gear sets that share a ring gear and a planet carrier.

In such a further embodiment, the second planetary gear set may include a sun gear that forms the first intermediate input path by being fixedly connected to the first intermediate output path of the first planetary gear set, a planet carrier that forms selectively acts as a fixed element and forms the second intermediate input path by being variably connected to the first intermediate output path of the first planetary gear set, and a ring gear that selectively acts as a fixed element.

In an alternative embodiment, the second planetary gear set may include a sun gear that forms the first intermediate input path by being fixedly connected to the first intermediate output path of the first planetary gear set, a ring gear that selectively acts as a fixed element and forms the second intermediate input path by being variably connected to the first intermediate output path of the first planetary gear set, and a planet carrier that selectively acts as a fixed element and forms the second intermediate output path.

Another exemplary gear train of an automatic transmission for a vehicle according to an embodiment of the present invention includes first and second planetary gear sets of single pinion planetary gear sets, a third planetary gear set of a compound planetary gear set sharing a ring gear and a planet carrier. The first planetary gear set includes a sun gear that always acts as a fixed element, a planet carrier that forms the first intermediate output path, and a ring gear that forms the first input path by being directly connected with the input shaft. The second planetary gear set includes a sun gear that forms the first intermediate input path by being fixedly connected to the first intermediate output path of the first planetary gear set, a planet carrier that selectively acts as a fixed element and forms the second intermediate input path by being variably connected to the first intermediate output path of the first planetary gear set, and a ring gear that selectively acts as a fixed element and forms the second intermediate output path. The third planetary gear set includes a smaller-diameter sun gear that forms the third intermediate input path by being variably connected to the first intermediate output path of the first planetary gear set, a larger-diameter sun gear that forms the fourth intermediate input path by being directly connected to the second intermediate output path of the second planetary gear set, a planet carrier that forms the second input path by being variably connected with the input shaft, and/or a ring gear that forms the output path by being variably connected with the sun gear.

Yet another exemplary gear train of an automatic transmission for a vehicle according to an embodiment of the present invention includes a first planetary gear set of a single pinion planetary gear set, a second planetary gear set of a double pinion planetary gear set, a third planetary gear set of a compound planetary gear set sharing a ring gear and a planet carrier. The first planetary gear set includes a sun gear that always acts as a fixed element, a planet carrier that forms the first intermediate output path, and a ring gear that forms the first input path by being directly connected with the input shaft. The second planetary gear set includes a sun gear that forms the first intermediate input path by being fixedly connected to the first intermediate output path of the first planetary gear set, a planet carrier that selectively acts as a fixed element, forms the second intermediate output path, and forms the second intermediate input path by being variably connected to the first intermediate output path of the first planetary gear set, and a ring gear that selectively acts as a fixed element. The third planetary gear set includes a smaller-diameter sun gear that forms the third intermediate input path by being variably connected to the first intermediate output path of the first planetary gear set, a larger-diameter sun gear that forms the fourth intermediate input path by being directly connected to the second intermediate output path of the second planetary gear set, a planet carrier that forms the second input path by being variably connected with the input shaft, and/or a ring gear that forms the output path by being variably connected with the sun gear.

Another exemplary gear train of an automatic transmission for a vehicle according to an embodiment of the present invention includes a first planetary gear set of a single pinion planetary gear set, a second planetary gear set of a double pinion planetary gear set, a third planetary gear set of a compound planetary gear set sharing a ring gear and a planet carrier. The first planetary gear set includes a sun gear that always acts as a fixed element, a planet carrier that forms the first intermediate output path, and/or a ring gear that forms the first input path by being directly connected with the input shaft. The second planetary gear set includes a sun gear that forms the first intermediate input path by being fixedly connected to the first intermediate output path of the first planetary gear set, a ring gear that selectively acts as a fixed element and forms the second intermediate input path by being variably connected to the first intermediate output path of the first planetary gear set, a planet carrier that selectively acts as a fixed element and forms the second intermediate output path. The third planetary gear set includes a smaller-diameter sun gear that forms the third intermediate input path by being variably connected to the first intermediate output path of the first planetary gear set, a larger-diameter sun gear that forms the fourth intermediate input path by being directly connected to the second intermediate output path of the second planetary gear set, a planet carrier that forms the second input path by being variably connected with the input shaft, and/or a ring gear that forms the output path by being variably connected with the sun gear.

BRIEF DESCRIPTION OF THE DRAWINGS

FIG. 2 is an operational chart of frictional members employed in a gear train according to a first exemplary embodiment of the present invention.

DETAILED DESCRIPTION OF THE INVENTION

Exemplary embodiments of the present invention will hereinafter be described in detail with reference to the accompanying drawings.

Figure 1:
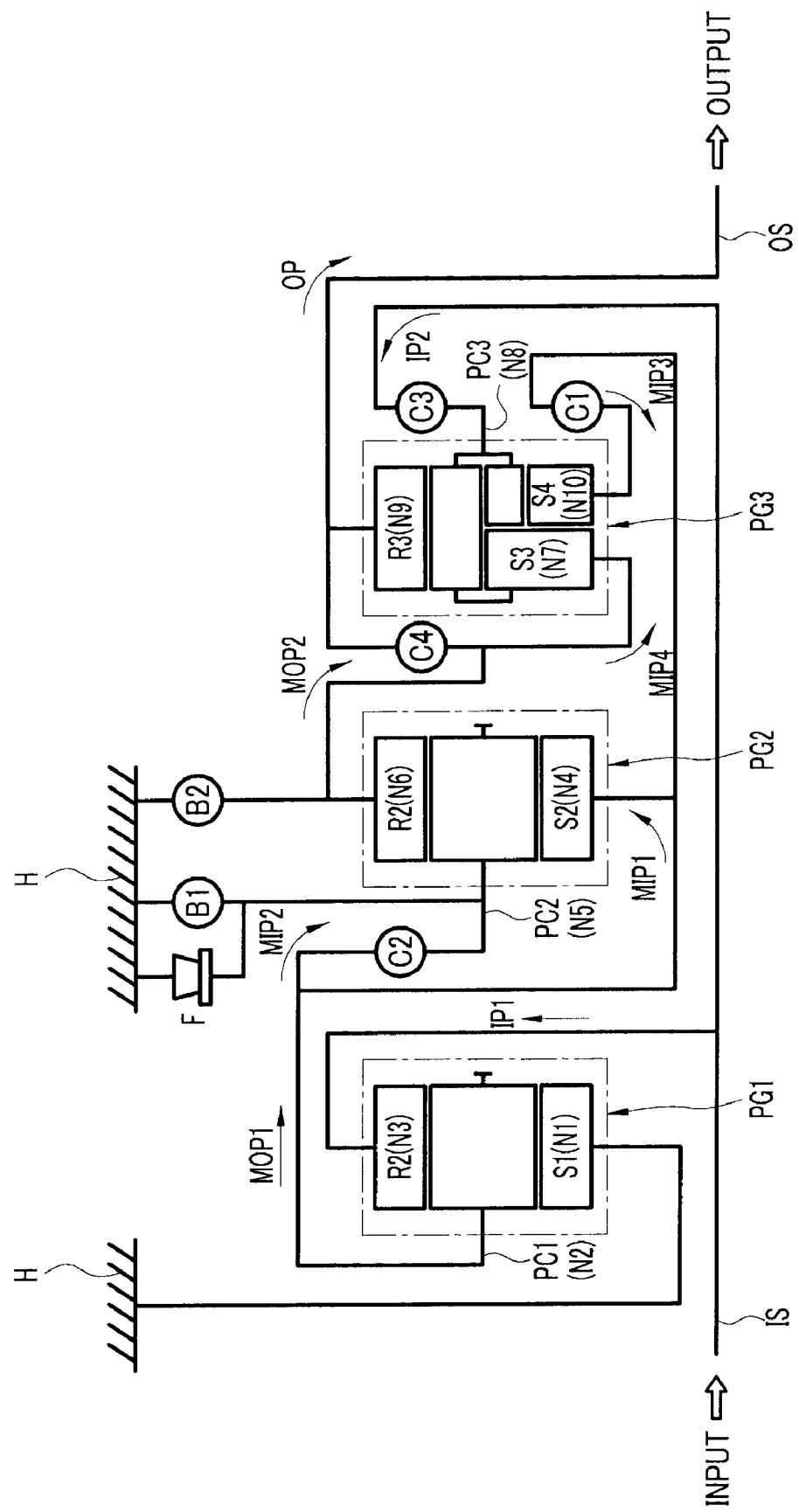
FIG. 1 is a schematic diagram of a gear train according to a first exemplary embodiment of the present invention.

As shown in FIG. 1, a gear train according to a first exemplary embodiment of the present invention includes simple planetary gear sets of first and second planetary gear sets PG1 and PG2 and a compound planetary gear set of a third planetary gear set PG3. A rotation speed inputted through an input shaft IS is changed by the first, second, and third planetary gear sets PG1, PG2, and PG3, and then outputted through an output shaft OS.

The input shaft IS, which is an input member, denotes a turbine shaft of a torque converter, and receives an engine torque through the torque converter. The output shaft OS, which is an output member, outputs a drive torque to vehicle wheels through an output gear and a differential.

The first planetary gear set PG1 receives the engine speed through a first input path IP1, and outputs a reduced speed through a first intermediate output path MOP1.

The first planetary gear set PG1 is formed as a single pinion planetary gear set having a sun gear S1, a planet carrier PC1, and a ring gear R1. Hereinafter, the sun gear S1 of the first planetary gear set PG1 is referred to as the first operational element N1, the planet carrier PC1 thereof is referred to as the second operational element N2, and the ring gear R1 thereof is referred to as the third operational element N3. The third operational element N3 is directly connected with the input shaft IS, and forms the first input path IP1. The second operational element N2 is an output element of the first planetary gear set PG1, and forms the first intermediate output path MOP1. The first operational element N1 is directly connected with a transmission housing H, and always acts as a fixed element.

According to such a configuration, rotation speed inputted through the third operational element N3 is reduced at the first planetary gear set PG1, and the reduced speed is outputted through the second operational element N2.

The second planetary gear set PG2 receives the reduced speed through two intermediate input paths MIP1 and MIP2, and outputs the reduced speed or a reversed speed through a second intermediate output path MOP2. Also, the second planetary gear set PG2 may selectively act as a fixed element.

The second planetary gear set PG2 is formed as a single pinion planetary gear set having a sun gear S2, a planet carrier PC2, and a ring gear R2. Hereinafter, the sun gear S2 of the second planetary gear set PG2 is referred to as the fourth operational element N4, the planet carrier PC2 is referred to as the fifth operational element N5, and the ring gear R2 is referred to as the sixth operational element N6. The fourth operational element N4 is directly connected with the first intermediate output path MOP1, and forms the first intermediate input path MIP1. The fifth operational element N5 is variably connected with the first intermediate output path MOP1 via a second clutch C2, and forms the second intermediate input path MIP2. The sixth operational element N6 is connected with the third planetary gear set PG2, and forms the second intermediate output path MOP2.

The fifth operational element N5 is variably connected with the transmission housing H via a first brake B1 and a one-way clutch F disposed in parallel, and selectively acts as a fixed element. The sixth operational element N6 is variably connected with the transmission housing H interposing a second brake B2, and selectively acts as a fixed element.

According to such a configuration, the second planetary gear set PG2 outputs a reversed speed through the second intermediate output path MOP2 when the first brake B1 or one-way clutch F operates while the second planetary gear set PG2 is receiving the reduced speed through the first intermediate input path MIP1. When the second planetary gear set PG2 simultaneously receives the reduces speed through the first and second intermediate input paths MIP1 and MIP2, the same speed is output through the second intermediate output path MOP2. When the second brake B2 operates, the second intermediate output path MOP2 (i.e., the sixth operational element N6 of the second planetary gear set PG2) acts as a fixed element.

The third planetary gear set PG3 selectively receives the engine speed from the input shaft IS through a second input path IP2, selectively receives the reduced speed of the first planetary gear set PG1 through a third intermediate input path MIP3, and receives the output speed of second planetary gear set PG2 through a fourth intermediate input path MIP4. Then, the third planetary gear set PG3 generates eight forward speeds and one reverse speed, and outputs it through a final output path OP.

The third planetary gear set PG3 is formed as a combination of a single pinion planetary gear set and a double pinion planetary gear set wherein a planet carrier and a ring gear is shared by the two planetary gear sets therein. Thus, the third planetary gear set PG3 has a common planet carrier PC3, and a common ring gear R3, a larger-diameter sun gear S3, and a smaller-diameter sun gear S4.

Hereinafter, the larger-diameter sun gear S3 is referred to as a seventh operational element N7, the planet carrier PC3 is referred to as an eighth operational element N8, the ring gear R3 is referred to as a ninth operational element N9, and the smaller-diameter sun gear S4 is referred to as a tenth operational element N10. The seventh operational element N7 is directly connect with the second intermediate output path MOP2, and forms the third intermediate input path MIP3. The tenth operational element N10 is variably connected with the first intermediate output path MOP1, and forms the fourth intermediate input path MIP4. The eighth operational element N8 is variably connected with the input shaft IS, and forms the second input path IP2. The ninth operational element N9 is connected with the output shaft OS, and forms a final output path OP.

The tenth operational element N10 is variably connected with the input shaft IS interposing a first clutch C1, and selectively acts as an input element. The eighth operational element N8 is variably connected with the second operational element N2 interposing a third clutch C3, and selectively acts as an input element. The seventh operational element N7 and the ninth operational element N9 are variably interconnected by a fourth clutch C4.

The first, second, third, and fourth clutches C1, C2, C3, and C3 and the first and second brakes B1 and B2 can be enabled as a multi-plate hydraulic pressure friction device that are frictionally engages by hydraulic pressure.

FIG. 2 is an operational chart of frictional members, i.e., clutches and brakes, employed in a gear train according to a first exemplary embodiment of the present invention. As shown in FIG. 2, two friction members operate in each speed according to a gear train according to a first exemplary embodiment of the present invention.

Figure 3:
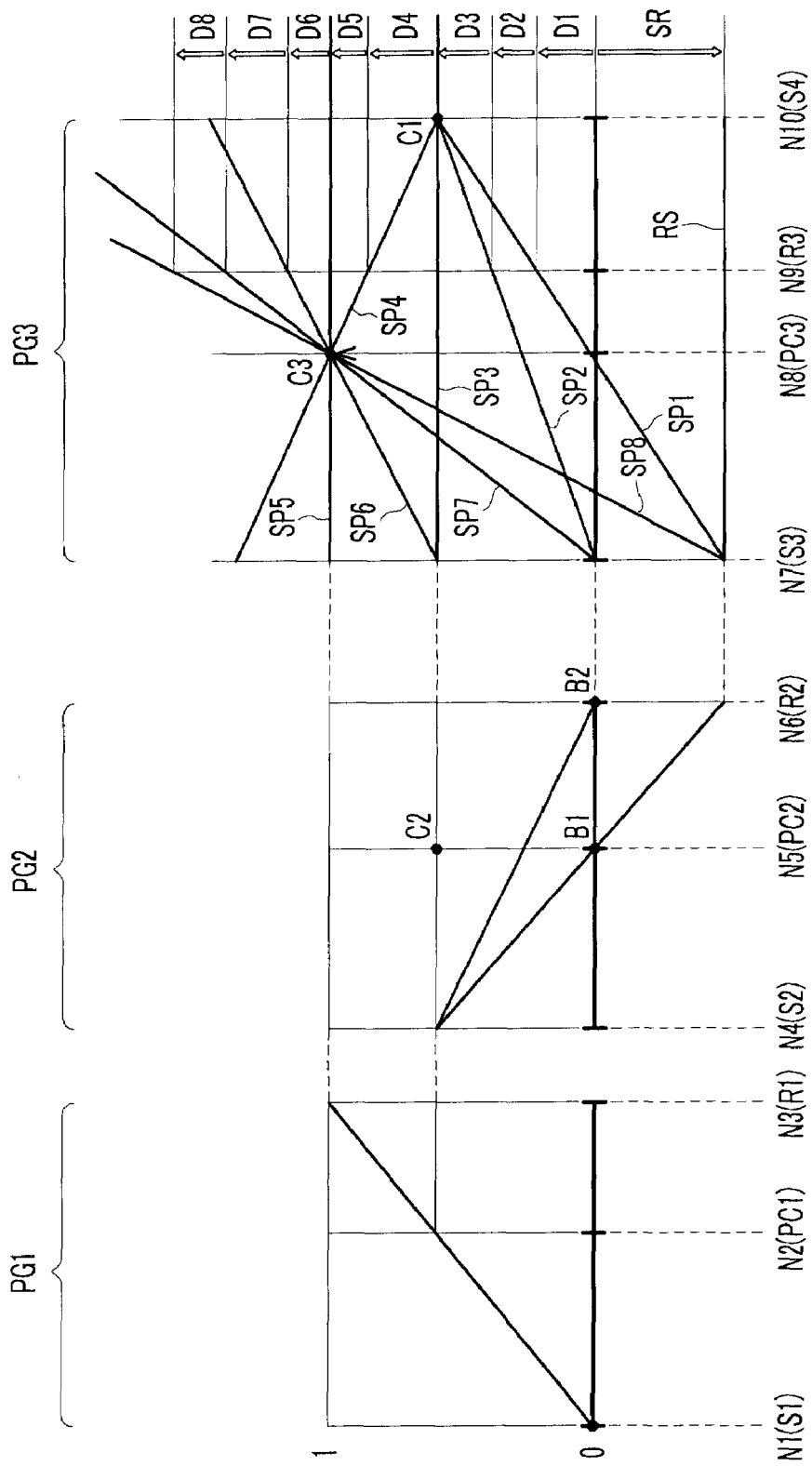
FIG. 3 is a speed diagram of a gear train according to a first exemplary embodiment of the present invention.

FIG. 3 is a speed diagram of a gear train according to a first exemplary embodiment of the present invention. In FIG. 3, a lower horizontal line implies 0 (zero) rotation speed, and an upper horizontal line implies 1.0 rotation speed (i.e., the same rotation speed as the input shaft IS).

In FIG. 3, three vertical lines of the first planetary gear set PG1 correspond to, sequentially from the left to the right, a first operational element N1 having a sun gear S1, a second operational element N2 having a planet carrier PC1, and a third operational element N3 having a ring gear R1. The horizontal spacing between the three vertical lines depends on a sun gear/ring gear teeth ratio of the first planetary gear set PG1.

In addition, three vertical lines of the second planetary gear set PG2 correspond to, sequentially from the left to the right, a fourth operational element N4 having a sun gear S2, a fifth operational element N5 having a planet carrier PC1, and a sixth operational element N6 having a ring gear R2. The horizontal spacing between the three vertical lines depends on a sun gear/ring gear teeth ratio of the second planetary gear set PG2.

Also, four vertical lines of the third planetary gear set PG3 correspond to, sequentially from the left to the right, a seventh operational element N7 having a larger-diameter sun gear S3, a eighth operational element N8 having a planet carrier PC3, a ninth operational element N9 having a ring gear R3, and a tenth operational element N10 having a smaller-diameter sun gear S4. The horizontal spacing between the four vertical lines depends on sun gear/ring gear teeth ratios of the third planetary gear set PG3.

The content and creation of a shift diagram as described above will be understood by persons of ordinary skill in the art, based on the teachings herein contained and therefore need to be described in further detail.

As shown in FIG. 2, at the first forward speed, the first clutch C1 and the one-way clutch F is controlled to operate.

In this case, regarding the first planetary gear set PG1, the first operational element N1 acts as a fixed element while the third operational element N3 receives the engine speed.

Therefore, a reduced speed is output from the first planetary gear set PG1 through the second operational element N2 (refer to FIG. 3).

Regarding the second planetary gear set PG2, the fifth operational element N5 acts as a fixed element by the function of the one-way clutch F while the output speed of the second operational element N2 is inputted to the fourth operational element N4. In this case, the second planetary gear set PG2 outputs a reversed speed through the sixth operational element N6.

Then, in the third planetary gear set PG3, the reversed speed of the sixth operational element N6 is inputted to the seventh operational element N7, and the reduced speed of the second operational element N2 is inputted to the tenth operational element N10 by the operation of the first clutch C1. Therefore, a first forward speed line SP1 is formed by the third planetary gear set PG3. Now, the final output speed of the gear train becomes a height D1 of the first forward speed line SP1 at the position of the ninth operational element N9, and thus the first forward speed is realized.

At the second forward speed, the second brake B2 is controlled to operate from the state of the first forward speed.

In this case, the same as in the first forward speed, the first operational element N1 of the first planetary gear set PG1 acts as a fixed element while the third operational element N3 receives the engine speed. Therefore, a reduced speed is output from the first planetary gear set PG1 through the second operational element N2.

Regarding the second planetary gear set PG2, the sixth operational element N6 acts as a fixed element by the operation of the second brake B2 while the output speed of the second operational element N2 is inputted to the fourth operational element N4. In this case, the second planetary gear set PG2 does not produce an output speed since the output element (i.e., the sixth operational element N6) thereof becomes fixed to the transmission housing H.

Then, in the third planetary gear set PG3, the seventh operational element N7 acts as a fixed element since it is directly connected with the sixth operational element N6 that is fixed by the second brake B2. The reduced speed of the second operational element N2 is inputted to the tenth operational element N10 by the operation of the first clutch C1. Therefore, a second forward speed line SP2 is formed by the third planetary gear set PG3. Now, the final output speed of the gear train becomes a height D2 of the second forward speed line SP2 at the position of the ninth operational element N9, and thus the second forward speed is realized.

At the third forward speed, the second brake B2 that operated at the second forward speed is released, and the fourth clutch C4 is controlled to operate.

In this case, the same as in the second forward speed, the first operational element N1 of the first planetary gear set PG1 acts as a fixed element while the third operational element N3 receives the engine speed. Therefore, a reduced speed is output from the first planetary gear set PG1 through the second operational element N2.

Regarding the second planetary gear set PG2, the fifth and sixth operational elements N5 and N6 become idle since none of the second clutch C2 and the first and second brakes B1 and B2. Therefore, in this case, the second planetary gear set PG2 does not contribute to the power transmission because it does not form an output speed, although the second planetary gear set PG2 receives the reduced speed of the second operational element N2 through the fourth operational element N4.

The third planetary gear set PG3 integrally rotates by the operation of the fourth clutch C4. More specifically, the third planetary gear set PG3 integrally rotates at the reduced speed of the second operational element N2 by the operation of the first clutch C1. Therefore, a third forward speed line SP3 is formed by the third planetary gear set PG3. Now, the final output speed of the gear train becomes a height D3 of the third forward speed line SP3 at the position of the ninth operational element N9, and thus the third forward speed is realized.

At the fourth forward speed, the fourth clutch C4 that operated at the third forward speed is released, and the third clutch C3 is controlled to operate.

In this case, the same as in the second forward speed, the first operational element N1 of the first planetary gear set PG1 acts as a fixed element while the third operational element N3 receives the engine speed. Therefore, a reduced speed is output from the first planetary gear set PG1 through the second operational element N2.

Regarding the second planetary gear set PG2, the fifth and sixth operational elements N5 and N6 become idle since none of the second clutch C2 and the first and second brakes B1 and B2. Therefore, in this case, the second planetary gear set PG2 does not contribute to the power transmission because it does not form an output speed, although the second planetary gear set PG2 receives the reduced speed of the second operational element N2 through the fourth operational element N4.

Regarding the third planetary gear set PG3, the reduced speed of the second operational element N2 is inputted to the tenth operational element N10 by the operation of the first clutch C1, and the engine speed is inputted to the eighth operational element N8 by the operation of the third clutch C3. Therefore, a fourth forward speed line SP4 is formed by the third planetary gear set PG3. Now, the final output speed of the gear train becomes a height D4 of the fourth forward speed line SP4 at the position of the ninth operational element N9, and thus the fourth forward speed is realized.

At the fifth forward speed, the first clutch C1 that operated at the fourth forward speed is released, and the fourth clutch C4 is controlled to operate.

In this case, the same as in the fourth forward speed, the first operational element N1 of the first planetary gear set PG1 acts as a fixed element while the third operational element N3 receives the engine speed. Therefore, a reduced speed is output from the first planetary gear set PG1 through the second operational element N2.

Regarding the second planetary gear set PG2, the fifth and sixth operational elements N5 and N6 become idle since none of the second clutch C2 and the first and second brakes B1 and B2. Therefore, in this case, the second planetary gear set PG2 does not contribute to the power transmission because it does not form an output speed, although the second planetary gear set PG2 receives the reduced speed of the second operational element N2 through the fourth operational element N4.

The third planetary gear set PG3 integrally rotates by the operation of the fourth clutch C4. More specifically, the third planetary gear set PG3 integrally rotates at the engine speed by the operation of the third clutch C3. Therefore, a fifth forward speed line SP5 is formed by the third planetary gear set PG3. Now, the final output speed of the gear train becomes a height D5 of the fifth forward speed line SP5 at the position of the ninth operational element N9, and thus the fifth forward speed is realized.

At the sixth forward speed, the fourth clutch C4 that operated at the fifth forward speed is released, and the second clutch C2 is controlled to operate.

In this case, the same as in the fifth forward speed, the first operational element N1 of the first planetary gear set PG1 acts as a fixed element while the third operational element N3 receives the engine speed. Therefore, a reduced speed is output from the first planetary gear set PG1 through the second operational element N2.

Regarding the second planetary gear set PG2, the reduced speed of the second operational element N2 is inputted to the fourth operational element N4 and also to the fifth operational element N5. Therefore, in this case, the second planetary gear set PG2 integrally rotates and directly outputs the reduced speed through the sixth operational element N6.

Then, in the third planetary gear set PG3, the output speed of the sixth operational element N6 is inputted to the seventh operational element N7, and the engine speed is inputted to the eighth operational element N8 by the operation of the third clutch C3. Therefore, a sixth forward speed line SP6 is formed by the third planetary gear set PG3. Now, the final output speed of the gear train becomes a height D6 of the sixth forward speed line SP6 at the position of the ninth operational element N9, and thus the sixth forward speed is realized.

At the seventh forward speed, the second clutch C2 that operated at the sixth forward speed is released, and the second brake B2 is controlled to operate.

In this case, the same as in the sixth forward speed, the first operational element N1 of the first planetary gear set PG1 acts as a fixed element while the third operational element N3 receives the engine speed. Therefore, a reduced speed is output from the first planetary gear set PG1 through the second operational element N2.

Regarding the second planetary gear set PG2, the sixth operational element N6 acts as a fixed element by the operation of the second brake B2 while the output speed of the second operational element N2 is inputted to the fourth operational element N4. In this case, the second planetary gear set PG2 does not produce an output speed since the output element (i.e., the sixth operational element N6) thereof becomes fixed to the transmission housing H.

Then, in the third planetary gear set PG3, the seventh operational element N7 directly connected with the sixth operational element N6 acts as a fixed element, and the engine speed is inputted to the eighth operational element N8 by the operation of the third clutch C3. Therefore, a seventh forward speed line SP7 is formed by the third planetary gear set PG3. Now, the final output speed of the gear train becomes a height D7 of the seventh forward speed line SP7 at the position of the ninth operational element N9, and thus the seventh forward speed is realized.

At the eighth forward speed, the second brake B2 that operated at the seventh forward speed is released, and the first brake B1 is controlled to operate.

In this case, the same as in the seventh forward speed, the first operational element N1 of the first planetary gear set PG1 acts as a fixed element while the third operational element N3 receives the engine speed. Therefore, a reduced speed is output from the first planetary gear set PG1 through the second operational element N2.

Regarding the second planetary gear set PG2, the fifth operational element N5 acts as a fixed element by the function of the first brake B1 while the output speed of the second operational element N2 is inputted to the fourth operational element N4. In this case, the second planetary gear set PG2 outputs a reversed speed through the sixth operational element N6.

Then, in the third planetary gear set PG3, the reversed speed of the sixth operational element N6 is inputted to the seventh operational element N7, and the engine speed is inputted to the eighth operational element N8 by the operation of the third clutch C3. Therefore, a eighth forward speed line SP8 is formed by the third planetary gear set PG3. Now, the final output speed of the gear train becomes a height D8 of the eighth forward speed line SP8 at the position of the ninth operational element N9, and thus the eighth forward speed is realized.

At the reverse speed, the fourth clutch C4 and the first brake B1 are controlled to operate.

In this case, the same as in the forward speeds, the first operational element N1 of the first planetary gear set PG1 acts as a fixed element while the third operational element N3 receives the engine speed. Therefore, a reduced speed is output from the first planetary gear set PG1 through the second operational element N2.

Regarding the second planetary gear set PG2, the fifth operational element N5 acts as a fixed element by the function of the first brake B1 while the output speed of the second operational element N2 is inputted to the fourth operational element N4. In this case, the second planetary gear set PG2 outputs a reversed speed through the sixth operational element N6.

Then, the third planetary gear set PG3 integrally rotates by the operation of the fourth clutch C4, while the reversed speed of the sixth operational element N6 is inputted to the seventh operational element N7. Therefore, a reverse speed line RS is formed by the third planetary gear set PG3. Now, the final output speed of the gear train becomes a height SR of the reverse speed line SR at the position of the ninth operational element N9, and thus the reverse speed is realized.

Figure 4:
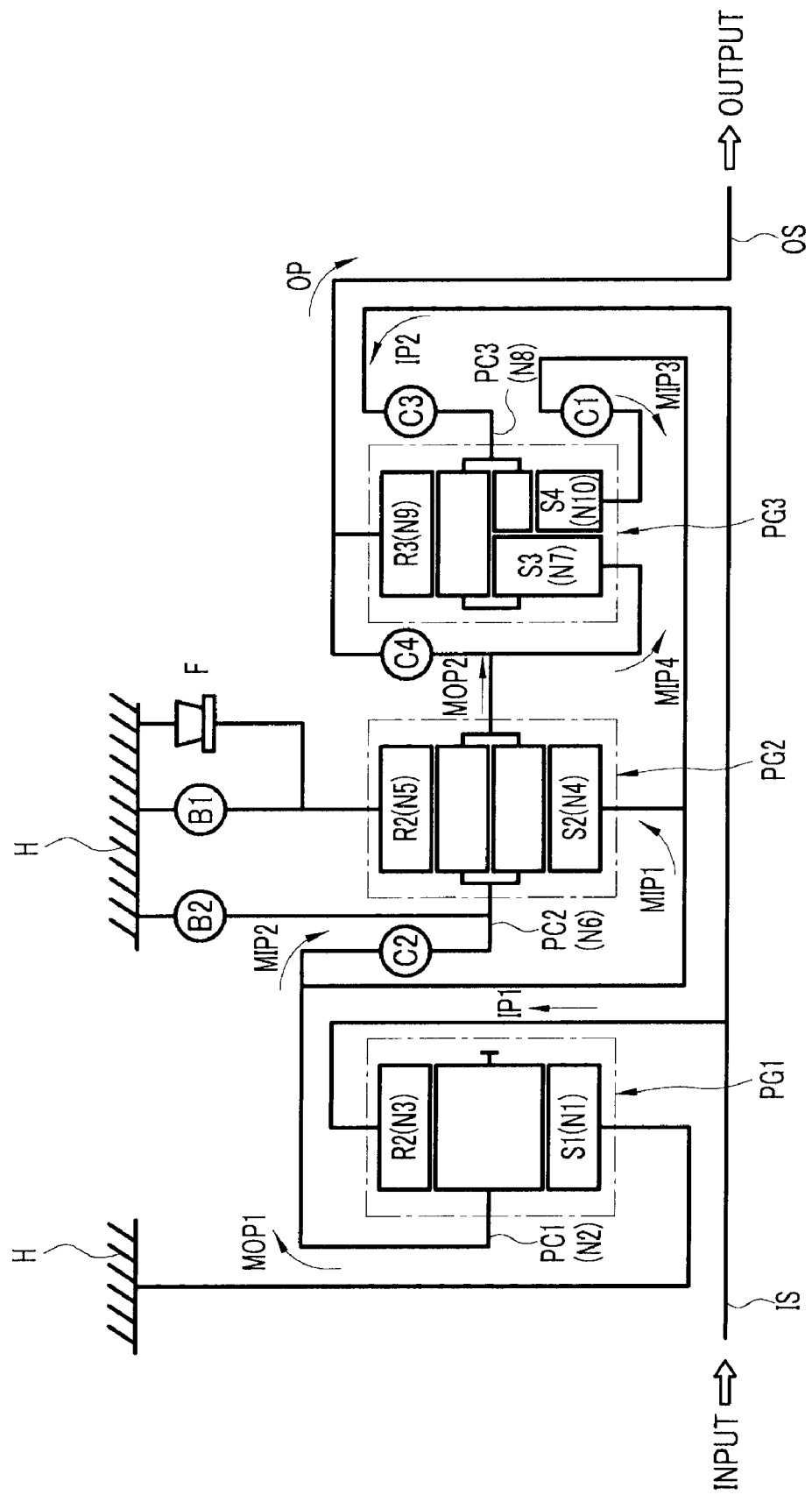
FIG. 4 is a schematic diagram of a gear train according to a second exemplary embodiment of the present invention.

FIG. 4 is a schematic diagram of a gear train according to a second exemplary embodiment of the present invention. The gear train according to the second exemplary embodiment is similar to the gear train according to the first exemplary embodiment. However, in comparison with the first exemplary embodiment, a second planetary gear set PG2 is formed as a double pinion planetary gear set. Also, the arrangements of the first brake B1 (together with the one-way clutch F) and the second brake B2 are interchanged.

The same as in the first exemplary embodiment, the second planetary gear set PG2 according to the second embodiment receives the reduced speed through two intermediate input paths MIP1 and MIP2, and outputs the reduced speed or a reversed speed through a second intermediate output path MOP2. Also, the second planetary gear set PG2 may selectively act as a fixed element.

The second planetary gear set PG2 is formed as a double pinion planetary gear set. Hereinafter, a sun gear S2 of the second planetary gear set PG2 is referred to as the fourth operational element N4, a ring gear R2 is referred to as the fifth operational element N5, and a planet carrier PC2 is referred to as the sixth operational element N6. The fourth operational element N4 is directly connected with the first intermediate output path MOP1, and forms the first intermediate input path MIP1. The sixth operational element N6 is variably connected with the first intermediate output path MOP1 interposing the second clutch C2, and forms the second intermediate input path MIP2. Also, the sixth operational element N6 is connected with the seventh operational element N7 of the third planetary gear set PG3, and forms the second intermediate output path MOP2.

The fifth operational element N5 is variably connected with the transmission housing H via a first brake B1 and a one-way clutch F disposed in parallel, and selectively acts as a fixed element. The sixth operational element N6 is variably connected with the transmission housing H interposing a second brake B2, and selectively acts as a fixed element.

According to such a configuration, the second planetary gear set PG2 outputs a reversed speed through the second intermediate output path MOP2 when the first brake B1 or one-way clutch F operates while the second planetary gear set PG2 is receiving the reduced speed through the first intermediate input path MIP1. When the second planetary gear set PG2 simultaneously receives the reduces speed through the first and second intermediate input paths MIP1 and MIP2, the same speed is output through the second intermediate output path MOP2. When the second brake B2 operates, the second intermediate output path MOP2 (i.e., the sixth operational element N6 of the second planetary gear set PG2) acts as a fixed element.

Figure 5:
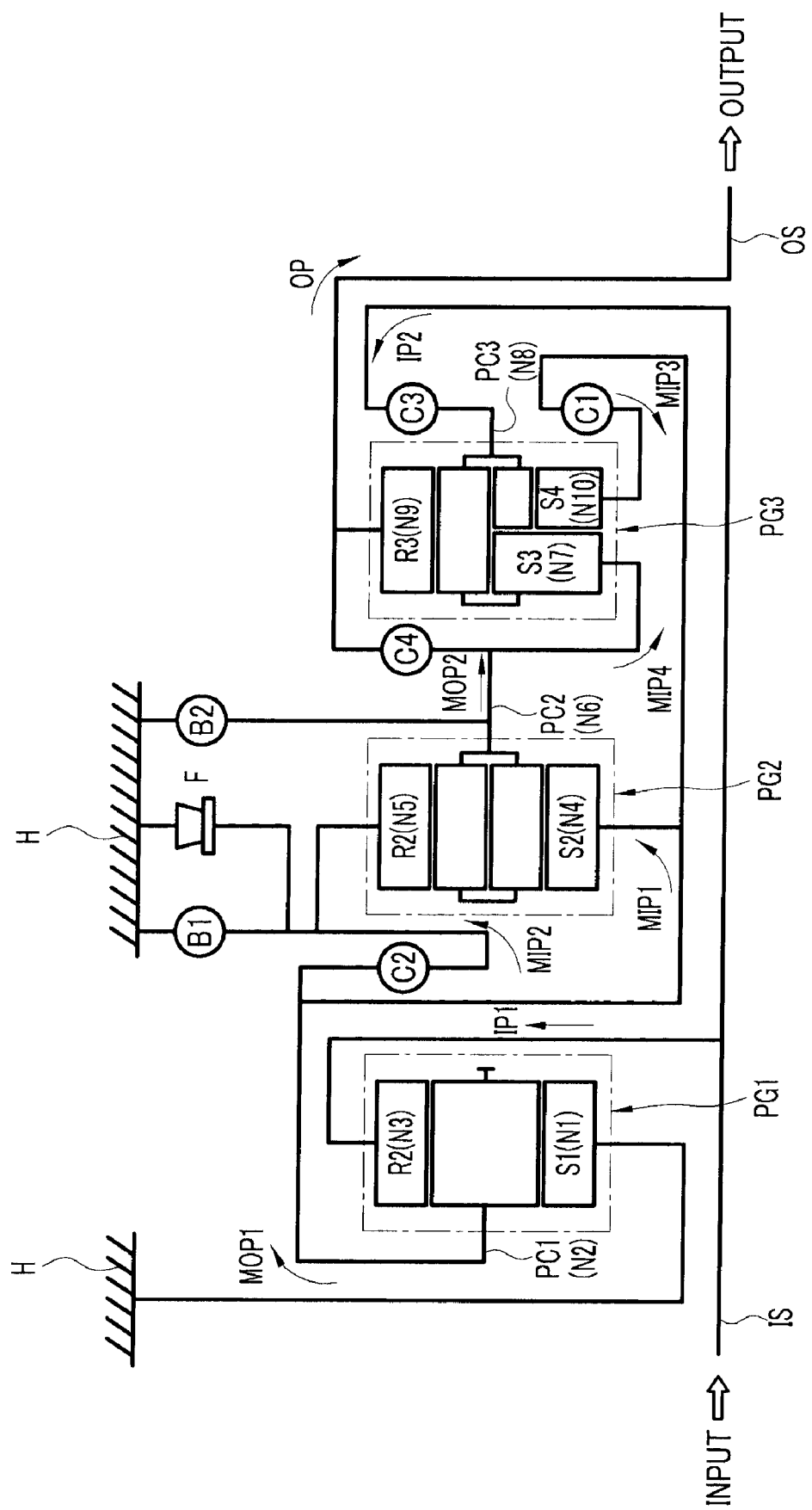
FIG. 5 is a schematic diagram of a gear train according to a third exemplary embodiment of the present invention.

FIG. 5 is a schematic diagram of a gear train according to a third exemplary embodiment of the present invention. The gear train according to the third exemplary embodiment is similar to the gear train according to the second exemplary embodiment. However, in comparison with the second exemplary embodiment, the second intermediate input path MIP2 is changed from the sixth operational element N6 (refer to the planet carrier PC2 in FIG. 4) to the fifth operational element N5 (refer to the ring gear R2 in FIG. 5).

The fourth operational element N4 is directly connected with the first intermediate output path MOP1, and forms the first intermediate input path MIP1. The fifth operational element N5 is variably connected with the first intermediate output path MOP1 interposing the second clutch C2, and forms the second intermediate input path MIP2. The sixth operational element N6 is connected with the seventh operational element N7 of the third planetary gear set PG3, and forms the second intermediate output path MOP2.

The fifth operational element N5 is variably connected with the transmission housing H via a first brake B1 and a one-way clutch F disposed in parallel, and selectively acts as a fixed element. The sixth operational element N6 is variably connected with the transmission housing H interposing a second brake B2, and selectively acts as a fixed element.

According to such a configuration, the second planetary gear set PG2 outputs a reversed speed through the second intermediate output path MOP2 when the first brake B1 or one-way clutch F operates while the second planetary gear set PG2 is receiving the reduced speed through the first intermediate input path MIP1. When the second planetary gear set PG2 simultaneously receives the reduces speed through the first and second intermediate input paths MIP1 and MIP2, the same speed is output through the second intermediate output path MOP2. When the second brake B2 operates, the second intermediate output path MOP2 (i.e., the sixth operational element N6 of the second planetary gear set PG2) acts as a fixed element.

Figure 6:
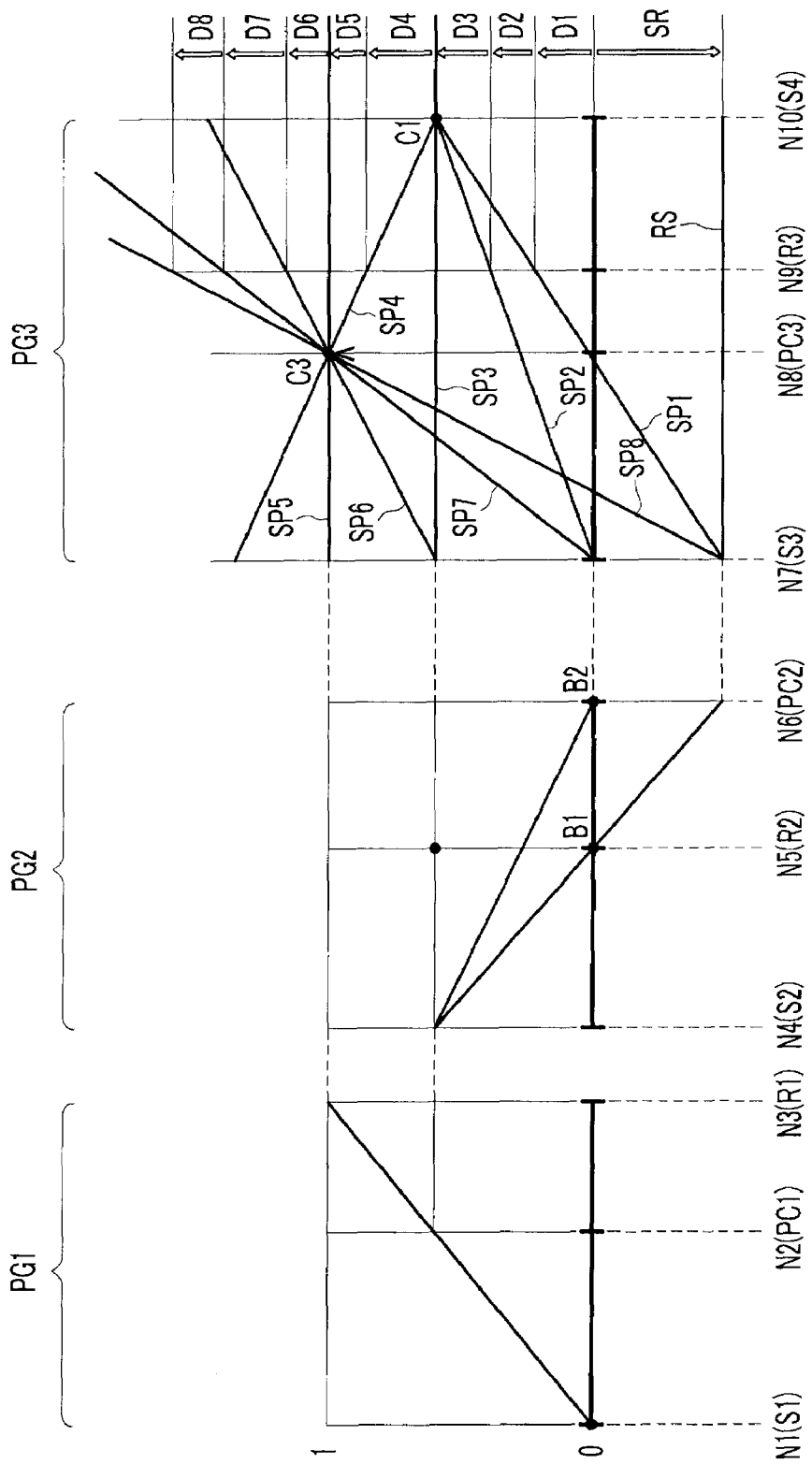
FIG. 6 is a speed diagram of gear trains according to second and third exemplary embodiments of the present invention.

The gear trains according to the second and third exemplary embodiments form speed lines as shown in FIG. 6. In comparison with FIG. 3 showing the speed lines of the first exemplary embodiment, the fifth and sixth operational elements N5 and N6 of the second planetary gear set PG2 are changed from the planet carrier PC2 and the ring gear R2 to the ring gear R2 and planet carrier PC2 because the second planetary gear set PG2 is changed from a single pinion planetary gear set to a double pinion planetary gear set. However, the shifting operations of the second and third exemplary embodiments remain the same as the first embodiment, and are not described in further detail. The second clutch C2 is connected to the sixth operational element N6 in the second exemplary embodiment, but to the fifth operational element N5 in the third exemplary embodiment. However, in either case, the second planetary gear set PG2 integrally rotates by the operation of the second clutch C2, and thus such a difference does not affect the shifting operation.

As described above, according to exemplary embodiments of the present invention, eight forward speeds and one reverse speed are realized by using two simple planetary gear sets and one compound planetary gear set in combination with four clutches and two brakes. According to such a gear train, power transmission performance of an automatic transmission may be improved, and fuel consumption may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A gear train of an automatic transmission having first and second planetary gear sets comprising simple planetary gear sets and a third planetary gear set comprising a compound planetary gear set, and a plurality of friction members, wherein:
   the first planetary gear set reduces an engine speed received from an input shaft through a first input path and outputs the reduced speed through a first intermediate output path;
   the second planetary gear set receives the reduced speed through first and second intermediate input paths, and outputs the reduced speed or a reversed speed through a second intermediate output path, the second planetary gear set selectively acting as a fixed element; and
   the third planetary gear set selectively receives the engine speed from the input shaft through a second input path, selectively receives input speeds from the first and second planetary gear sets through third and fourth intermediate input paths, and outputs a plurality of changes speeds through a final output path;
   wherein the first and second planetary gear sets comprise single pinion planetary gear sets; and
   the third planetary gear set comprises a compound planetary gear set in a combination of single and double pinion planetary gear sets sharing a ring gear and a planet carrier.

2. A gear train of an automatic transmission having first and second planetary gear sets comprising simple planetary gear sets and a third planetary gear set comprising a compound planetary gear set, and a plurality of friction members, wherein:
   the first planetary gear set reduces an engine speed received from an input shaft through a first input path and outputs the reduced speed through a first intermediate output path;
   the second planetary gear set receives the reduced speed through first and second intermediate input paths, and outputs the reduced speed or a reversed speed through a second intermediate output path, the second planetary gear set selectively acting as a fixed element; and
   the third planetary gear set selectively receives the engine speed from the input shaft through a second input path, selectively receives input speeds from the first and second planetary gear sets through third and fourth intermediate input paths, and outputs a plurality of changes speeds through a final output path,
   wherein the second planetary gear set comprises:
   a sun gear that forms the first intermediate input path by being fixedly connected to the first intermediate output path of the first planetary gear set;
   a planet carrier that selectively acts as a fixed element and forms the second intermediate input path by being variably connected to the first intermediate output path of the first planetary gear set; and a ring gear that selectively acts as a fixed element and forms the second intermediate output path.

3. A gear train of an automatic transmission having first and second planetary gear sets comprising simple planetary gear sets and a third planetary gear set comprising a compound planetary gear set, and a plurality of friction members, wherein:

the first planetary gear set reduces an engine speed received from an input shaft through a first input path and outputs the reduced speed through a first intermediate output path;

the second planetary gear set receives the reduced speed through first and second intermediate input paths, and outputs the reduced speed or a reversed speed through a second intermediate output path, the second planetary gear set selectively acting as a fixed element; and the third planetary gear set selectively receives the engine speed from the input shaft through a second input path, selectively receives input speeds from the first and second planetary gear sets through third and fourth intermediate input paths, and outputs a plurality of changes speeds through a final output path;

wherein the second planetary gear set comprises:

a sun gear that forms the first intermediate input path by being fixedly connected to the first intermediate output path of the first planetary gear set;

a ring gear that selectively acts as a fixed element and forms the second intermediate input path by being variably connected to the first intermediate output path of the first planetary gear set; and a planet carrier that selectively acts as a fixed element and forms the second intermediate output path.

4. A gear train of an automatic transmission having first and second planetary gear sets comprising single pinion planetary gear sets, a third planetary gear set comprising a compound planetary gear set sharing a ring gear and a planet carrier, wherein the first planetary gear set comprises:

a sun gear acting as a fixed element;

a planet carrier that forms a first intermediate output path; and a ring gear that forms the first input path by being directly connected with an input shaft, the second planetary gear set comprises:

a sun gear that forms a first intermediate input path by being fixedly connected to the first intermediate output path of the first planetary gear set;

a planet carrier that selectively acts as a fixed element and forms a second intermediate input path by being variably connected to the first intermediate output path of the first planetary gear set; and a ring gear that selectively acts as a fixed element and forms a second intermediate output path, and the third planetary gear set comprises:

a smaller-diameter sun gear that forms a third intermediate input path by being variably connected to the first intermediate output path of the first planetary gear set;

a larger-diameter sun gear that forms a fourth intermediate input path by being directly connected to the second intermediate output path of the second planetary gear set;

a planet carrier that forms the second input path by being variably connected with the input shaft; and a ring gear that forms the output path by being variably connected with a sun gear.

5. A gear train of an automatic transmission for a vehicle having a first planetary gear set comprising a single pinion planetary gear set, a second planetary gear set of comprising double pinion planetary gear set, and a third planetary gear set comprising a compound planetary gear set sharing a ring gear and a planet carrier, wherein the first planetary gear set comprises:

a sun gear acting as a fixed element;

a planet carrier that forms a first intermediate output path; and a ring gear that forms the first input path by being directly connected with an input shaft, the second planetary gear set comprises:

a sun gear that forms a first intermediate input path by being fixedly connected to the first intermediate output path of the first planetary gear set;

a ring gear that selectively acts as a fixed element and forms a second intermediate input path by being variably connected to the first intermediate output path of the first planetary gear set;

a planet carrier that selectively acts as a fixed element and forms a second intermediate output path, and the third planetary gear set comprises:

a smaller-diameter sun gear that forms a third intermediate input path by being variably connected to the first intermediate output path of the first planetary gear set;

a larger-diameter sun gear that forms a fourth intermediate input path by being directly connected to the second intermediate output path of the second planetary gear set;

a planet carrier that forms the second input path by being variably connected with the input shaft; and a ring gear that forms the output path by being variably connected with a sun gear.

* * * * *